US 8,161,281 B1

(12) United States Patent
Johnson et al.

(10) Patent No.: US 8,161,281 B1
(45) Date of Patent: Apr. 17, 2012

(54) HIGH ASSURANCE DATA TAGGER FOR I/O FEEDS

(75) Inventors: Tony L. Johnson, Mount Vernon, IA (US); Antonino N. Mione, Volga, IA (US); James A. Marek, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1123 days.

(21) Appl. No.: 11/403,440

(22) Filed: Apr. 13, 2006

(51) Int. Cl.
*H04L 29/06* (2006.01)
(52) U.S. Cl. ........ 713/166; 713/153; 713/170; 713/179; 726/18; 726/19; 726/26
(58) Field of Classification Search .................. 713/166, 713/153, 168, 170, 179, 181; 726/16, 17, 726/18, 19, 20, 26, 27
See application file for complete search history.

(56) References Cited

U.S. PATENT DOCUMENTS

| | | | |
|---|---|---|---|
| 6,304,973 B1 * | 10/2001 | Williams | 726/3 |
| 6,725,276 B1 * | 4/2004 | Hardjono et al. | 709/238 |
| 6,842,860 B1 * | 1/2005 | Branstad et al. | 713/170 |
| 7,178,025 B2 * | 2/2007 | Scheidt et al. | 713/168 |
| 7,426,636 B1 * | 9/2008 | McGrew et al. | 713/160 |
| 2002/0124024 A1 * | 9/2002 | Patterson et al. | 707/517 |
| 2003/0005331 A1 * | 1/2003 | Williams | 713/201 |
| 2003/0110131 A1 * | 6/2003 | Alain et al. | 705/51 |
| 2004/0128553 A1 * | 7/2004 | Buer et al. | 713/201 |
| 2005/0209875 A1 * | 9/2005 | Bleumer et al. | 705/1 |
| 2005/0257045 A1 * | 11/2005 | Bushman et al. | 713/156 |
| 2007/0056037 A1 * | 3/2007 | Focke et al. | 726/22 |

OTHER PUBLICATIONS

Krawczyk, H. et al., Request for Comments: 2104 HMAC: Keyed-Hashing for Message Authentication, Feb. 1997 [retrieved on Dec. 2, 2009]. Retrieved from: http://www.ietf.org/rfc/rfc2104.txt.*
Rockwell Collins, Common Crypto Circuit Card Assembly, Apr. 4, 2005 [retrieved on Dec. 2, 2009]. Retrieved from: http://csrc.nist.gov/groups/STM/cmvp/documents/140-1/140sp/140sp538.pdf.*

* cited by examiner

*Primary Examiner* — Taghi Arani
*Assistant Examiner* — Justin T Darrow
(74) *Attorney, Agent, or Firm* — Donna P. Suchy; Daniel M. Barbieri

(57) ABSTRACT

The present invention is a method and system for high-assurance data tagging for input/output feeds. The method may include executing a high-assurance tagging application on a microprocessor (e.g., the microprocessor being designed for use in a high-assurance embedded system). Further, the method may include analyzing a message with the high-assurance tagging application and generating and attaching a tag to the message. In addition, the method may include binding the tag to the message by applying a message authentication scheme and providing a mechanism for down-stream applications to identify information about data included in the message by reference to the tag.

14 Claims, 4 Drawing Sheets

HIGH ASSURANCE DATA TAGGER FOR I/O FEEDS

FIELD OF THE INVENTION

The present invention relates generally to the field of computer technology and more particularly, to a method and system for securing data through high-assurance tagging.

BACKGROUND OF THE INVENTION

In light of recent terrorist attacks on America's command and control system, the United States Department of Defense sponsored an initiative to fundamentally change the manner in which the command and control system operates. The initiative involves a transition from the traditional hierarchical structured command and control system that is wired in series, to a global, Web-enabled environment that may adapt efficiently to changing circumstances and allows for full information exchange across a battlespace. This newly created environment is commonly known as net-centric operations.

A primary benefit of net-centric operations or net-centricity is the increased availability of information to the entire battlespace. Net-centricity relies upon the ability to access and provide information at the appropriate time to allow informed decision making. As such, net-centric operations must be reliable and trustworthy and not be susceptible to enemy attacks. For instance, a need exists to tag data from various input/output (I/O) devices at the source such that security policies may be enforced by downstream components such as routers, guards and consumers of data.

Therefore, it would be desirable to provide a method and system for tagging data received from an I/O device at the source so that security policies may be enforced by downstream components. It would be further desirable that such system is high assurance and non-bypassable.

SUMMARY OF THE INVENTION

In accordance with a first aspect of the present invention, a method for high assurance data tagging for input/output (I/O) feeds is provided. In such aspect, the method includes executing a high-assurance tagging application on a microprocessor (e.g., the microprocessor being designed for use in a high-assurance embedded system). Further, the method may include analyzing a message with the high-assurance tagging application and generating and attaching a tag to the message. In addition, the method may include binding the tag to the message by applying a message authentication scheme and providing a mechanism for down-stream applications to identify information about data included in the message by reference to the tag.

In accordance with a further aspect of the present invention, an additional method for high assurance data tagging for I/O feeds is disclosed. The method may include receiving message data from a bus and attaching a tag to the message data based upon a combination of the source of the message and the content of the message. The method may also entail encapsulating the message data with an authentication mechanism to prohibit data modification and checking the authentication and use of the tag to enforce a routing policy. In addition, the method may involve utilizing the tag to control access to or display of the data contained in the message.

In accordance with an additional aspect of the present invention, a system for high assurance data tagging for I/O feeds is provided. The system for high assurance data tagging for input/output (I/O) feeds may include a tagging device for tagging data received from an input/output source. For instance, the tagging device includes a microprocessor for hosting an application, receiving the data from a bus and attaching at least one tag to the data. In addition, the tagging device includes a tagging mechanism to encapsulate the data with an authentication mechanism to prohibit data modification. The system may also include a downstream guard unit coupled to the tagging device for checking the authentication mechanism and using at least one tag to enforce routing policies. The tagging device and the guard unit share a secret key to implement a system for high assurance data tagging for I/O feeds.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
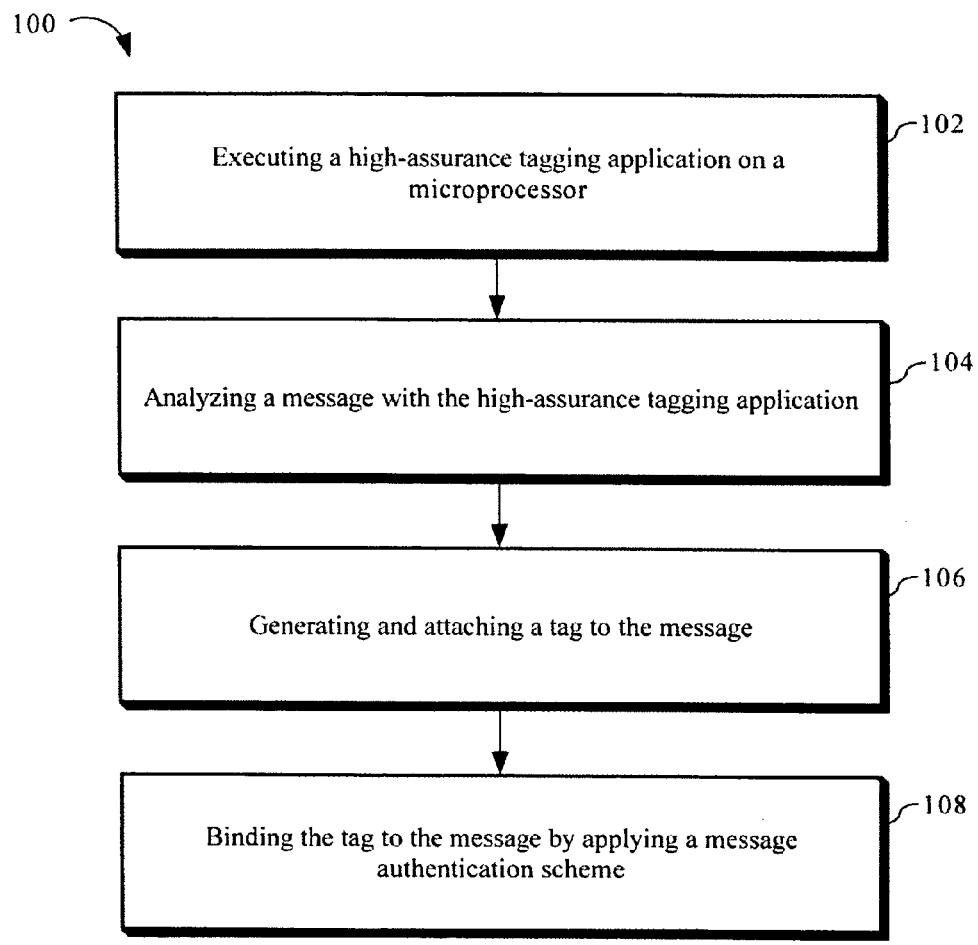
FIG. 1 is a flow diagram of a method for tagging data in accordance with an exemplary embodiment of the present invention.

Referring to FIG. 1, a method 100 for tagging data is provided. In an exemplary embodiment, the method 100 allows high assurance data tagging for input/output (I/O) feeds. The method 100 may include executing a high-assurance tagging application on a microprocessor 102. The microprocessor may be designed for use in an embedded system such as an advanced architecture microprocessor (AAMP). For instance, the method 100 may employ an AAMP7 to connect to commercial off-the-shelf (COTS) interface components. In an embodiment, the method 100 involves analyzing a message with the high-assurance tagging application 104. For example, a message from a waveform with the high-assurance tagging application may be analyzed. High-assurance tagging applications may be defined as code falling within Evaluation Assurance Levels (EALs) 5, 6 and 7 of the Common Criteria for Information Technology Security Evaluation (an international standard for evaluating secure computer systems). EALs 5, 6 and 7 require some application of formal methods to demonstrate that the appropriate level of assurance has been met.

In addition, the method 100 may entail generating and attaching a tag to the message 106. For example, a tag may be attached to the message by Hashed Message Authentication Code (HMAC). Such tagging may aid in efficient routing by other devices (e.g., a cross-domain guard or a secure routing device) at a later time. It is contemplated that additional methods may be utilized to attach the tag to the message such as use of a 'digital signature.' HMAC is, however, preferred to that of a 'digital signature.' A 'digital signature' relies upon costly, complex public key operations while HMAC uses simple hashing techniques on data mixed with shared secret key material. As such, HMAC operations are cost and time efficient and have little impact on overall throughput.

The method 100 may also include binding the tag to the message by applying a message authentication scheme 108. For example, the message authentication scheme allows data to be configured so that it is non-modifiable by a consumer application. Further, the information identified may include security level classification (e.g., SECRET, TOPSECRET, or like classifications), security level compartment (e.g., communication securities) and other information which may be necessary or desired in order to make routing decisions. In an embodiment, the aforementioned tagging method is not only high assurance, but is required (i.e., non-bypassable) in the system.

Figure 2:
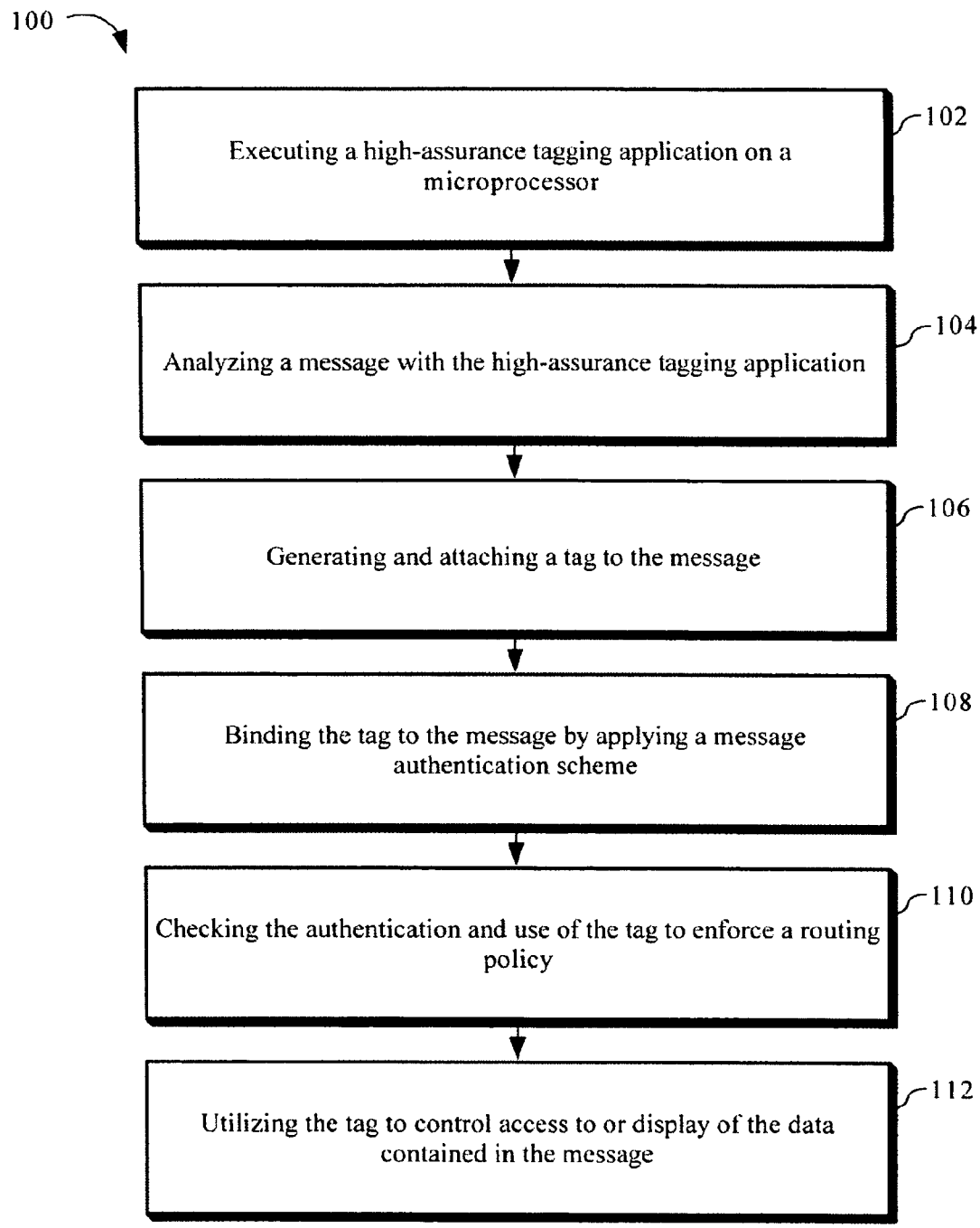
FIG. 2 is a flow diagram of the method illustrated in FIG. 1 in accordance with an exemplary embodiment of the present invention, wherein additional steps which may be included within the method are provided.

Referring to FIG. 2, additional steps which may be included within method 100 are provided. As illustrated in FIG. 2, method 100 may include checking the authentication and use of the tag to enforce a routing policy 110 following binding the tag to the message by applying a message authentication scheme 108. For instance, authentication is checked by a cross domain guard or a secure router. In a further embodiment, the method 100 may utilizing the tag to control access to or display of the data contained in the message 112.

Figure 3:
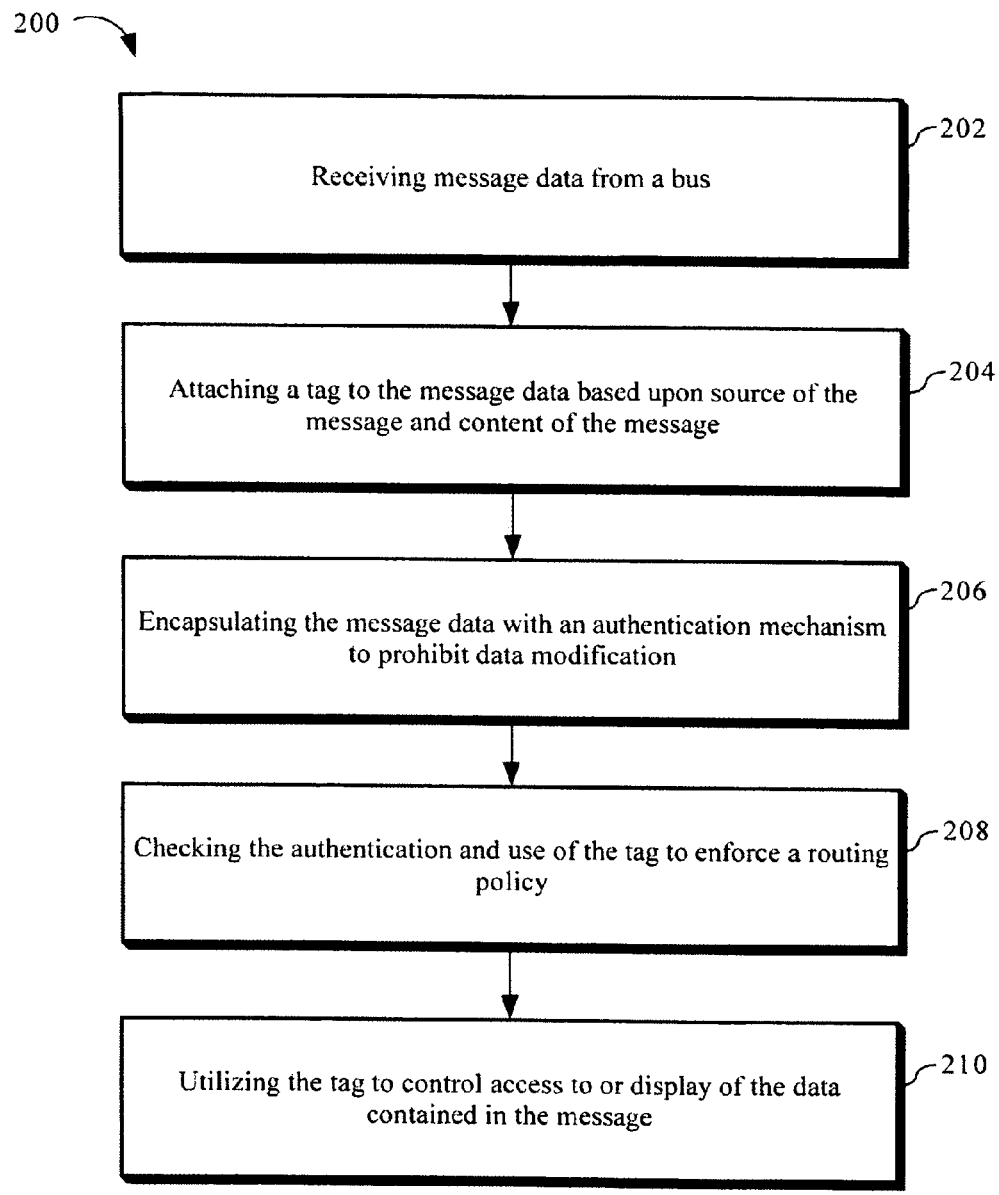
FIG. 3 is a flow diagram of an additional method for tagging data in accordance with an exemplary embodiment of the present invention.

Referring to FIG. 3, an additional method 200 for high assurance data tagging for I/O feeds is provided. In an exemplary embodiment, the method 200 may include receiving message data from a bus 202. For instance, the bus is a peripheral component interconnect (PCI) bus. The method may also involve attaching a tag to the message data based upon various attributes including the source of the message and content of the message 204. For example, the tagging is based upon a combination of the receiving bus where the data was received along with the specific message being received. Further, in an advantageous embodiment, the tag is attached by an authentication method. In a further embodiment, message content may include security level classification (e.g., SECRET, TOPSECRET, or like classifications), security level compartment (e.g., communication securities) and other information with may be necessary or desired in order to make routing decisions.

The method 200 may also entail encapsulating the message data with an HMAC as an authentication mechanism to prohibit undetected data modification 206 (e.g., by a consumer application). In an embodiment, the method 200 includes checking the authentication and use of the tag to enforce a routing policy 208. For instance, checking the authentication and use of the tag to enforce a routing policy 208 is by use of at least one of a cross domain guard or a secure router. In addition, the method 200 may involve utilizing the tag to control access to or display of the data contained in the message 210. In an embodiment, the tagging method 200 is required (i.e., non-bypassable) in the system.

Figure 4:
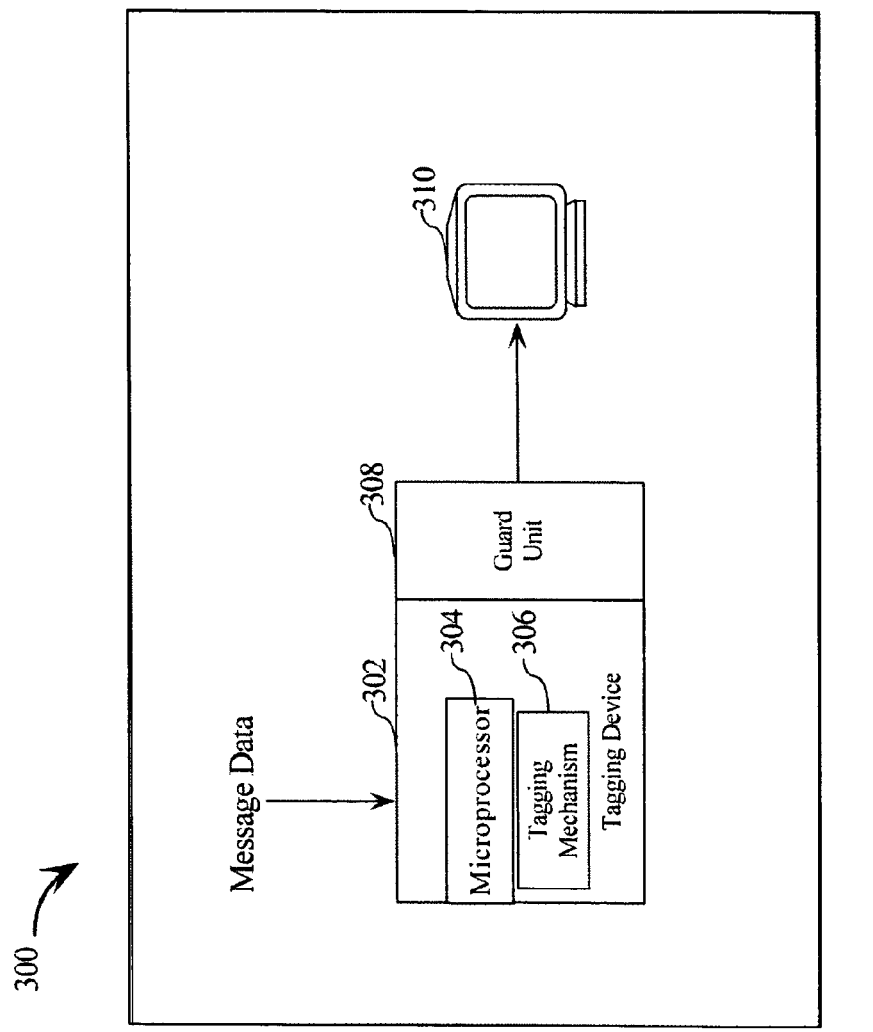
FIG. 4 is a block diagram of a system for tagging data in accordance with an exemplary embodiment of the present invention.

Referring to FIG. 4, a system 300 for data tagging is provided. In an exemplary embodiment the system 300 is for high assurance data tagging for I/O feeds. In the present embodiment, the system 300 for high assurance data tagging for I/O feeds may include a tagging device 302 for tagging data received from an I/O source. In an embodiment, the tagging device 302 includes a microprocessor 304 for hosting an application (e.g., a trusted or certifiable application), receiving the data from a bus (such as a PCI bus) and attaching at least one tag to the data. The microprocessor 304 may be designed for use in an embedded system such as an advanced architecture microprocessor (AAMP). For instance, an AAMP7 connected to a commercial off-the-shelf (COTS) interface components may be employed to create a trusted interface and tagging device 302. In an embodiment, at least one tag is attached by a tagging mechanism such as HMAC 306 to encapsulate the data with an authentication mechanism to prohibit data modification. As stated previously, HMAC is preferred over use of other binding techniques for HMAC relies on simple hashing techniques on the data with shared secret key material instead of complex, cost inefficient public key operations. In a further embodiment, the tag may include security level classification (e.g., SECRET, TOPSECRET, or like classifications), security level compartment (e.g., communication securities) and other information with may be necessary or desired in order to make routing decisions.

The system 300 may also incorporate a guard unit 308 coupled to the tagging device 302 for checking the authentication mechanism and using the at least one tag to enforce routing policies. For example, checking the authentication and use of the tag to enforce a routing policy is by use of at least one of a cross domain guard or a secure router.

In an embodiment, the system 300 is high assurance (EAL 5, 6 or 7) and non-bypassable. The tagging device 302 and the guard unit 308 implement the system for high assurance data tagging for I/O feeds by sharing a secret key. Secret keys are generally used for symmetric cryptography. In this use, the same key must be known by both the sender (encrypting data for transmission) and the receiver (decrypting the received data). They can also be used for message authentication codes. In the case of using secret keys for message authentication, the process is something like the following: key material may be mixed with the data to be protected (in a way that both communicating parties know); a hash function may be applied to this slightly modified data stream; the key may be applied to a second 'outer' hash of the first result. Such process yields a type of checksum that cannot be reproduced or checked without also possessing the same secret key. Thus, the receiver knows that the data (e.g., tags plus message data) have not been altered and was generated by some originator (e.g., a tagger) possessing the same key.

It is contemplated that the keys may be managed in a variety of ways. First, appropriately cleared personnel may set new keys at the beginning of a mission or at other desired time points. Alternatively, the keys may be set automatically. For instance, units may perform a cryptographic protocol when they are initialized. The cryptographic protocol may allow two parties to agree on a secret key over an insecure communications channel. The secret key may then be used to encrypt subsequent communications using a symmetric key cipher. This cryptographic protocol is often referred to as a Diffie-Hellman key exchange. The first technique relies upon personnel performing procedures correctly compared to the cryptographic protocol which involves implementing public key operations (e.g., modular exponentiation on large numbers) that may involve more lines of code to be used at initialization time.

In additional embodiments, the system 300 may include a display system 310 which may utilize the tags in making decisions on information that may be displayed based upon user authorization. For instance, a user authorized to access TOPSECRET information, is allowed to have information tagged with the tag TOPSECRET to be displayed as well as information from more non-secure levels (e.g., SECRET, PUBLIC, and the like).

It is contemplated that the present methods and systems may be implemented in numerous systems including an integrated communication, surveillance, and navigation system in an aircraft or in a sonar system in a maritime vessel.

It is further contemplated that the disclosed system and method may be implemented within a software-defined communication radio system including Joint Tactical Radio System (JTRS), components within Future Combat System (FCS), or similar net-centric based systems. It is further contemplated that the disclosed system and method may be supported by avionic architectures including Integrated Modular Avionics (IMA) and Multi-Mode Multi-Function Avionics (MMDA). JTRS is a family of software defined radios that provide military users with voice, data and video communications as well as interoperability across the joint battle space. Such systems may be deployed in airborne platforms as well as selected maritime, fixed-station, and ground mobile platforms. The disclosed system and method are not, however, limited to these software-defined radios.

It is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that portions of the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for providing high assurance data tagging via a data tagging system, the method comprising:

analyzing a message utilizing a high-assurance tagging application, the high-assurance tagging application being executed on a microprocessor of the data tagging system, the microprocessor being configured for supporting more than one level of security, wherein analyzing the message includes: analyzing an input/output (I/O) source of the message and a content of the message, and identifying a security level classification of the message and a security level compartment of the message based on the analyzing of the I/O source of the message and the content of the message;

generating a tag for attaching to the message, the tag including the security level classification and the security level compartment; and attaching the tag to the message by applying a message authentication scheme, wherein the message authentication scheme prohibits data modification and tag modification by any down-stream application.

2. The method as claimed in claim 1, wherein the message authentication scheme employs Hashed Message Authentication Code (HMAC).

3. The method as claimed in claim 1, further comprising:
checking authentication and use of the tag to enforce a routing policy by use of at least one of: a cross domain guard of the data tagging system; and a secure router of the data tagging system.

4. The method as claimed in claim 1, further comprising:
utilizing the tag to control at least one of: access to the data contained in the message; and display of the data contained in the message.

5. The method as claimed in claim 1, further comprising:
encrypting data included within the message prior to attaching the tag, the tag being attached to the message by applying the message authentication scheme, wherein the message authentication scheme employs Hashed Message Authentication Code (HMAC).

6. A method for providing high assurance data tagging via a data tagging system, the method comprising:

receiving message data from a bus;

analyzing an input/output (I/O) source of the message data and a content of the message data;

generating a tag based on the analyzing of the I/O source of the message data and the content of the message data, the tag including a security level classification of the message data and a security level compartment of the message data, the security level classification of the message data representing one of a plurality of supported security level classifications;

attaching the tag to the message data;

encapsulating the message data with an authentication mechanism to prohibit data modification and tag modification by any down-stream application;

enforcing a routing policy by checking authentication and use of the tag attached to the message data; and utilizing the tag to control at least one of: access to the message data;

and display of the message data.

7. The method as claimed in claim 6, wherein attaching a tag to the message data includes use of a secret key.

8. The method as claimed in claim 6, wherein the authentication mechanism utilizes a Hashed Message Authentication Code (HMAC).

9. The method as claimed in claim 6, wherein the encapsulating the message data includes prohibiting data modification by a consumer application.

10. The method as claimed in claim 6, wherein checking the authentication and use of the tag to enforce a routing policy is performed by at least one of: a cross domain guard; and a secure router.

11. A system, comprising:
a tagging device for tagging data received from an input/output (I/O) source, the tagging device including:
  a microprocessor configured for supporting more than one level of security and for hosting an application, the microprocessor being further configured for:
    receiving the data from a bus;
    analyzing the I/O source of the data and a content of the data to identify a security level classification of the data and a security level compartment of the data; and
    attaching at least one tag to the data, the at least one tag including the security level classification and the security level compartment; and
  a tagging mechanism configured for encapsulating the data with an authentication mechanism for prohibiting data modification and tag modification by any down-stream application; and
a guard unit connected to the tagging device, the guard unit configured for checking the authentication mechanism and using the at least one tag to enforce routing policies,
wherein the tagging device and the guard unit share a secret key to implement a system for high assurance data tagging for I/O feeds.

12. The system as claimed in claim 11, wherein the authentication mechanism utilizes Hashed Message Authentication Code (HMAC).

13. The system as claimed in claim 11, wherein the guard unit includes at least one of: a cross domain guard; and a secure router.

14. The method as claimed in claim 1, wherein the high-assurance tagging application is configured to satisfy at least one of: an Evaluation Assurance Level 5 (EAL5) requirement; an EAL6 requirement; and an EAL7 requirement.

* * * * *